(12) United States Patent
Chen et al.

(10) Patent No.: US 10,731,074 B2
(45) Date of Patent: Aug. 4, 2020

(54) ATTRITION RESISTANT PROPPANT COMPOSITE AND ITS COMPOSITION MATTERS

(71) Applicant: Arr-Maz Products, L.P., Mulberry, FL (US)

(72) Inventors: Frank Bor-Her Chen, Lakeland, FL (US); Aaron Nelson, Lakeland, FL (US); Michael Diaz, Mulberry, FL (US); Rachel E. Mathis, Valrico, FL (US)

(73) Assignee: Arr-Maz Products, L.P., Mulberry, FL (US)

( * ) Notice: Subject to any disclaimer, the term of this patent is extended or adjusted under 35 U.S.C. 154(b) by 258 days.

(21) Appl. No.: 15/471,132

(22) Filed: Mar. 28, 2017

(65) Prior Publication Data
US 2017/0198212 A1 Jul. 13, 2017

Related U.S. Application Data

(62) Division of application No. 14/669,815, filed on Mar. 26, 2015, now Pat. No. 9,969,929.
(Continued)

(51) Int. Cl.
*C09K 8/80* (2006.01)
*E21B 43/267* (2006.01)
(Continued)

(52) U.S. Cl.
CPC ............... *C09K 8/805* (2013.01); *B01J 2/006* (2013.01); *B05D 1/02* (2013.01); *E21B 43/267* (2013.01);
(Continued)

(58) Field of Classification Search
None
See application file for complete search history.

(56) References Cited

U.S. PATENT DOCUMENTS

| 4,542,044 A | 9/1985 | Gano et al. |
| 4,594,268 A | 6/1986 | Kirwin |
| (Continued) | | |

FOREIGN PATENT DOCUMENTS

| CA | 2858920 | 6/2013 |
| GB | 1392462 | 4/1975 |
| (Continued) | | |

OTHER PUBLICATIONS

Anderson, Travis, "Respirable Silica Dust—Engineering Controls Roundtable", Oil & Gas Safety Conference; www.oshasafetyconference.org/Events/ugm/Osha2014/Presentations.aspx; Dec. 2014.
(Continued)

*Primary Examiner* — John J Figueroa
(74) *Attorney, Agent, or Firm* — Head, Johnson, Kachigian & Wilkinson, PC

(57) ABSTRACT

A hydraulic fracturing and gravel packing proppant composite with protectant on the surface of the proppant and the composition matters of the protectant and proppant. The surface protectant reduces the generation of dust/fines from the proppant caused by abrasion and impingement during transportation and conveyance, particularly pneumatic transfer.

4 Claims, 11 Drawing Sheets

Related U.S. Application Data

(60) Provisional application No. 61/971,995, filed on Mar. 28, 2014.

(51) Int. Cl.
*B01J 2/00* (2006.01)
*B05D 1/02* (2006.01)
*C09K 3/22* (2006.01)
*E21B 43/26* (2006.01)

(52) U.S. Cl.
CPC .......... *C09K 3/22* (2013.01); *C09K 2208/04* (2013.01); *C09K 2208/28* (2013.01); *E21B 43/26* (2013.01)

(56) References Cited

U.S. PATENT DOCUMENTS

| | | | |
|---|---|---|---|
| 4,780,233 A | 10/1988 | Roe | |
| 5,604,184 A | 2/1997 | Ellis et al. | |
| 5,820,787 A | 10/1998 | McNabb et al. | |
| 5,855,816 A | 1/1999 | McNabb et al. | |
| 6,355,083 B1 | 3/2002 | Ogzewalla | |
| 6,558,445 B2 | 5/2003 | Hunter | |
| 6,582,819 B2 | 6/2003 | McDaniel et al. | |
| 6,705,400 B1 | 3/2004 | Nguyen et al. | |
| 6,725,931 B2 | 4/2004 | Nguyen et al. | |
| 6,887,834 B2 | 5/2005 | Nguyen et al. | |
| 7,021,379 B2 | 4/2006 | Nguyen | |
| 7,063,151 B2 | 6/2006 | Nguyen et al. | |
| 7,261,156 B2 | 8/2007 | Nguyen et al. | |
| 7,264,051 B2 | 9/2007 | Nguyen et al. | |
| 7,270,879 B2 | 9/2007 | McCrary | |
| 7,350,571 B2 | 4/2008 | Nguyen et al. | |
| 8,133,587 B2 | 3/2012 | Rediger et al. | |
| 8,227,026 B2 | 7/2012 | McDaniel et al. | |
| 8,360,149 B2 | 1/2013 | Hughes et al. | |
| 8,946,130 B2 | 2/2015 | Zamora et al. | |
| 2003/0075075 A1 | 4/2003 | Spence et al. | |
| 2003/0131999 A1* | 7/2003 | Nguyen | C09K 8/68 166/280.2 |
| 2005/0034861 A1 | 2/2005 | Saini et al. | |
| 2005/0244641 A1* | 11/2005 | Vincent | C09K 8/62 428/403 |
| 2006/0035790 A1 | 2/2006 | Okell et al. | |
| 2008/0078547 A1 | 4/2008 | Sinclair et al. | |
| 2008/0202750 A1* | 8/2008 | Rediger | C09K 8/805 166/280.2 |
| 2008/0207472 A1 | 8/2008 | Valls | |
| 2009/0107673 A1* | 4/2009 | Huang | C09K 8/516 166/280.2 |
| 2009/0266765 A1* | 10/2009 | Huang | B82Y 30/00 210/670 |
| 2010/0286000 A1* | 11/2010 | Huang | C09K 8/516 507/261 |
| 2012/0024526 A1 | 2/2012 | Liang et al. | |
| 2012/0283153 A1 | 11/2012 | McDaniel et al. | |
| 2013/0025867 A1 | 1/2013 | Sun et al. | |
| 2013/0056204 A1 | 3/2013 | McDaniel et al. | |
| 2013/0065800 A1 | 3/2013 | McDaniel et al. | |
| 2013/0186624 A1 | 7/2013 | McCrary et al. | |
| 2013/0192835 A1 | 8/2013 | Vorderbruggen et al. | |
| 2013/0225458 A1 | 8/2013 | Qin et al. | |
| 2013/0233545 A1* | 9/2013 | Mahoney | C09K 8/80 166/280.2 |
| 2014/0000891 A1* | 1/2014 | Mahoney | C09K 8/805 166/280.2 |
| 2014/0014348 A1 | 1/2014 | Mahoney et al. | |
| 2014/0060832 A1 | 3/2014 | Mahoney et al. | |
| 2014/0137616 A1 | 5/2014 | Peacock et al. | |
| 2014/0228258 A1 | 8/2014 | Mahoney et al. | |
| 2014/0262247 A1 | 9/2014 | Duenckel et al. | |
| 2015/0119301 A1 | 4/2015 | McDaniel et al. | |
| 2015/0252252 A1 | 9/2015 | Soane et al. | |
| 2015/0315459 A1 | 11/2015 | McDaniel et al. | |

FOREIGN PATENT DOCUMENTS

| | | |
|---|---|---|
| RU | 2417590 | 5/2011 |
| RU | 2472834 | 1/2013 |
| RU | 2473583 | 1/2013 |
| WO | 2004092254 | 10/2004 |
| WO | 2009009886 | 1/2009 |
| WO | WO2009129025 | 10/2009 |
| WO | WO2010049467 | 5/2010 |
| WO | 2013016158 | 1/2013 |
| WO | WO 2013033391 | 3/2013 |
| WO | 2013158306 | 10/2013 |
| WO | WO2014085076 | 6/2014 |
| WO | WO2014120599 | 8/2014 |
| WO | 2015026806 | 2/2015 |
| WO | 2015144091 | 10/2015 |

OTHER PUBLICATIONS www.midwestind.com/product/kleen/; SoKleen; Midwest Industries; Canton, Ohio, 2014.
Fairmount Sandtrol, "Fines Reduce Long-Term Oil and gas Production", http://fairmountsantrol.com/wp-content/uploads/2014/09/Fines-Reduce-OG-Production-PB-914.pdf; Sugar Land, Texas, Aug. 2014.
Lyle, Don, "Proppants Open Production Pathways", Schlimberger, Hart Energy Publishing, Hosuton, TX; https://www.slb.com/~/media/Files/stimulation/industry_articles/201101_ep_proppant_design.ashx; Jan. 2011.
Conductivity Endurance; http://www.halliburton.com/public/pe/contents/Brochures/Web/H04351.pdf, Haliburton; 2005.
Ghosh, S., Rai, C. S., Sondergeld, C. H., & Larese, R. E. (Sep. 30, 2014). Experimental Investigation of Proppant Diagenesis. Society of Petroleum Engineers. doi:10.2118/171604-MS.
"Non-ionic fracture fluids can recover 90% permeability after proppant run"; http://www.offshore-mag.com/articles/print/volume-61/issue-10/news/non-ionic-fracture-fluids-can-recover-90-permeability-after-proppant-run.html; Offshore Magazine.
P. Nguyen, J.Weaver,M. Parker, M.McCabe, M. Hoogteijling and M. van der Horst, "A Novel Approach for Enhancing Proppant Consolidation: Laboratory Testing and Field Applications," SPE 77748, presented at the SPE Annual Technical Conference, San Antonio, Sep. 29-Oct. 2, 2002.
National Industrial Sand Association, "Silicosis Prevention Program", Washington, D.C., 2011.
International Search Report and Written Opinion; International Application Division; Korean Intellectual Property Office 189 Cheongsa-ro, Seo-gu, Daejeon, 35208, Republic of Korea, dated Jul. 19, 2018.

* cited by examiner

US 10,731,074 B2

ATTRITION RESISTANT PROPPANT COMPOSITE AND ITS COMPOSITION MATTERS

CROSS REFERENCE

This application is based on and claims priority to U.S. patent application Ser. No. 14/669,815 filed Mar. 26, 2015 and U.S. Patent Application No. 61/971,995 filed Mar. 28, 2014.

BACKGROUND OF THE INVENTION

Field of the Invention

This invention relates generally to a proppant composite, and more particularly, but not by way of limitation, to an attrition resistant proppant composite for use in hydraulic fracturing.

Description of the Related Art

Hydraulic fracturing is commonly used in oil and gas production to access carbon trapped in impermeable geological formations. The process involves injecting a highly pressurized fluid, typically containing water or another carrier, chemicals, and proppants, into a wellbore, which causes the underlying rock to crack. The proppants in the fluid then stay in the cracks in the rock and hold the cracks open, allowing underlying hydrocarbons to flow through the cracks into the wellbore for collection.

Proppants like quartz sand, resin coated sand, ceramics, and materials like bauxite used to make ceramics, for example, are now commonly used in hydraulic fracturing to increase the production of oil and gas from subterranean formations. However, all of these proppants tend to generate dust/fines upon shipping and handling before they are pumped into the well for fracturing. When quartz sand is employed for fracturing, for example, attrition and impingement among quartz particulates and between quartz particulates and the walls of the container occurs during shipping to the fracturing job site. This attrition and impingement are greatly increased during transfer and unloading of the material. Dust/fines are created during bin loading, belt transfer, blender loading, release from multi-sander operations, release from stingers, dust ejection from open fill ports, and other handling operations with potential adverse health and environmental effects. In particular, pneumatic air unloading creates high levels of dust/fines.

Dust/fines are microscopic particulate matter that can be suspended in the air. Such particulate matter occurs naturally, and can also be man-made. This invention is directed to limiting the creation of dust/fines through the use of attrition resistant proppant in transport and hydraulic fracturing and other applications. Respirable particles are a particular concern for the health and safety of workers and other persons who come into contact with dust/fines. These airborne particulates are potentially hazardous because of their ability to penetrate deep into the alveoli of the lungs. In particular, chronic or excessive exposure to respirable crystalline silica such as quartz has been shown to cause pneumoconiosis, commonly known as silicosis.

Within the class of dust/fines, respirable particles are those small enough to enter the alveoli of the lungs and generally include particulates with a diameter of 10 micrometers (or microns) or less. As particle size drops below 10 microns, the probability of particles becoming trapped in the alveoli increases. Although the present invention is successful in the suppression of dust/fines with a diameter of 10 microns or less (including fines with a diameter of 2.5 microns or less), the invention may also suppress other suspended particulate matter that may be larger or submicron in size. As greater medical and environmental awareness of the consequence of respirable suspended particles is known, this invention will continue to apply to the suppression of dust/fines in hydraulic fracturing and other applications as those terms may be understood in future practice or regulation.

With regard to the current regulatory environment, the U.S. Occupational Safety and Health Administration (OSHA) is an agency of the U.S. Department of Labor empowered to assure safe and healthful working conditions by setting and enforcing workplace standards. OSHA establishes Permissible Exposure Limits (PELs) for many chemical substances in 29 CFR 1910.1000. OSHA's current PEL for respirable silica dust in General Industry is found in 29 CFR 1910.1000 TABLE Z-3 and the OSHA Technical Manual (OTM) Section II: Chapter 1 Appendix J, Sample Calculations for Crystalline Silica, including the following formulation, Equation 6 from Section III.K.2 of Appendix J:

$$PEL(\text{mg/m}^3) = (10 \text{ mg/m}^3)/(2 + \% \text{ respirable quartz})$$

Therefore, for a dust containing 100% quartz, the PEL is 10/(100+2), or roughly 0.1 mg/m³. The term "respirable quartz" includes dusts containing greater than one percent quartz with a particle size small enough to reach the alveolar space in the lungs, or less than 10 µm in aerodynamic diameter. Dust exposures are expressed as either a particle concentration (for example, millions of particles per cubic foot of air or mppcf) or a gravimetric concentration (unit mass of particles per volume of air, such as mg/m³). OSHA's regulatory authority is subject to administrative rulemaking process which includes public comment and review. This administrative and political process can result in new or revised standards that take years to be developed, finalized, and promulgated as a standard. The employer's efforts to control silica exposures below the PEL, as addressed by the present invention, will become more difficult if OSHA's proposed rulemaking lowers the PEL to 0.05 milligrams of respirable crystalline silica per cubic meter of air (0.05 mg/m³), as indicated in OSHA's Proposed Rule to the Federal Register on Sep. 12, 2013.

OSHA recognizes that many of its PELs are outdated and that revising the current PELs is a lengthy and complicated process. As such, OSHA recommends that employers consider using alternative occupational exposure limits (i.e., NIOSH Recommended Exposure Limits (RELs) and the ACGIH TLVs). Regarding best industry industrial hygiene practices, the American Conference of Governmental Industrial Hygienists (ACGIH) is a member-based organization dedicated to the industrial hygiene and occupational health and safety industries. The ACGIH annually publishes the ACGIH Guide to Occupational Exposure Values, considered the standard resource for occupational exposure limits in the United States. The ACGIH Threshold Limit Value (TLV) for an eight-hour time weighted average (TWA) workshift exposure to respirable crystalline silica, as included in the 2015 Guide to Occupational Exposure Values and cited in OSHA's 29 CFR 1910.1200 Annotated TABLE Z-3 Mineral Dusts, is 0.025 mg/m3 for α-quartz. The National Institute for Occupational Safety and Health (NIOSH) is part of the Center for Disease Control and Prevention (CDC) within the U.S. Department of Health and Human Services. Among other things, NIOSH is responsible for conducting research and making recommendations for the prevention of work-related injury and illness based on the best available scientific data. The currently published NIOSH Recommended Exposure Level (REL) for a TWA associated with up to a ten-hour workday during a 40-hour workweek is 0.05 mg/m$^3$ for crystalline silica as respirable dust. In addition to these U.S. agencies, foreign agencies are also involved in setting workplace standards and recommendations, including the Scientific Committee on Occupational Exposure Limits (SCOEL) and Institut für Arbeitsschutz der Deutschen Gesetzlichen Unfallversicherung (IFA), which advise the European Commission regarding occupational exposure limits for chemicals in the workplace, and the Workplace Exposure Standards for Airborne Contaminants published in association with the Australian Work Health and Safety Act. The present invention is directed to complying with all these various standards and recommendations, as well as self-imposed standards that may exceed these requirements.

Proppant fines can also cause problems in the recovery of oil and gas. Fines are smaller than whole proppant and thus less effective at propping the cracks open for the oil and gas to flow through. Furthermore, they tend to clog the cracks, inhibiting the flow of hydrocarbons and reducing the productivity of the well.

Previous coated proppants have been aimed primarily at increasing the crush strength of the proppant, with dust control considered only as a secondary benefit. Increasing crush strength can be achieved by coating the proppant with resin. This is very expensive, however, and thus an undesirable solution to increase attrition resistance. Other coatings are aimed at controlling dust by agglomerating small dust particles, rather than preventing dust from forming in the first place.

Based on the foregoing, it is desirable to provide a proppant with low dust/fines subsequent to shipping and handling and, especially, during pneumatic air unloading.

It is further desirable for such a proppant to be a new kind of proppant for the hydraulic fracturing industry.

It is further desirable for such a proppant to allow users of the proppant to be in compliance with OSHA PEL, NIOSH REL, and similar requirements subsequent to shipping and handling and upon pneumatic air unloading, which will better protect workers and prevent nuisance dusting which might disturb the local community near the sand plant, the transload facilities, or the fracturing job site.

It is further desirable for such a proppant to facilitate compliance with a reduced OSHA PEL, NIOSH REL, or similar regulations if required in the future.

It is further desirable for such a proppant to be less expensive to produce than resin coated proppant.

It is further desirable for such a proppant to prevent dust formation rather than solely agglomerating existing dust.

SUMMARY OF THE INVENTION

In general, in a first aspect, the invention relates to a surface modified proppant comprising a proppant; and a chemical coating at least partially covering the proppant. The chemical coating may be non-petroleum-based, glycerin-based, propylene glycol-based, or a combination thereof. Additionally or alternately, the surface modified proppant may have a Turbidity Reduction Factor greater than about 40% and a Respirable Dust Reduction Factor greater than about 70%. Additionally or alternately, the chemical coating may not be a thermoset polymer, not be an ionic polymer, not be a thermoplastic elastomer, and not be a hydrogel. The coating may increase the attrition-resistance of the proppant. The coating may additionally or alternately reduce the generation of dust/fines of the proppant upon shipping, handling, pneumatic air unloading, or combinations thereof.

The proppant prior to coating application may be substantially dust free, and may be a raw substrate, including sand, ceramic, or composite material, minerals, ground shells, resin coated proppants, or combinations thereof. The coating may be non-toxic. The coating may not be an ionic polymer. The coating may be less than 2 wt. % of the surface modified proppant, less than 1 wt. % of the surface modified proppant, or 0.05 to 0.20 wt. % of the surface modified proppant. The coating may be glycerin-based coating, vegetable oil/wax-based coating, tall oil pitch based coating, alkyl ester based coating, or a combination thereof. If the coating is alkyl ester based coating, the coating may be lower alkyl ester based, particularly methyl and ethyl ester based.

The chemical coating may be applied to the proppant through spray, mechanical mixing, non-mechanical mixing, or a combination thereof. The coating may comprise multiple coatings, and the coatings may be applied sequentially or simultaneously onto the proppant. The multiple coatings may comprise a first coating and a second coating and the first coating may have a different chemical composition than the second coating. Alternately, the chemical composition of the first coating may be the same as the chemical composition of the second coating. The coating may be applied to the proppant prior to the proppant being used. The coating may comprise a thick layer of coating, a thin layer of coating, or a partial layer of coating.

The surface modified proppant may further comprise a chemical marker, such as a colorant, a UV dye, a conductivity enhancing chemical, or a combination thereof. Additionally or alternately, the surface modified proppant may further comprise a frac fluid delay-crosslinking agent, which may be betaine, gluconate, polyglycol, or a combination thereof. The coating may not require curing or drying.

In a second aspect, the invention relates to a method of producing a surface modified proppant, the method comprising adding a chemical coating to a proppant, where the chemical coating is not a thermoset polymer, not an ionic polymer, not a thermoplastic elastomer, and not a hydrogel, or more specifically non-petroleum-based, glycerin-based, propylene glycol-based, or a combination thereof, and mixing the coating and the proppant or spraying the coating on the proppant without mixing to produce the surface modified proppant. The coating may not be an ionic polymer. The coating may be less than 2 wt. % of the surface modified proppant, less than 1 wt. % of the surface modified proppant, or 0.05 to 0.20 wt. % of the surface modified proppant. The mixing may occur in a powered continuous mechanical blender, a powered batch mechanical blender, a static mixer, or a combination thereof. The method may further comprise adding a second chemical coating to the surface modified proppant and mixing the second chemical coating and the surface modified proppant.

In a third aspect, the invention relates to a method of reducing proppant attrition anywhere in a proppant supply chain, the method comprising using a surface modified proppant. The surface modified proppant may comprise a proppant and a chemical coating at least partially covering the proppant, where the chemical coating is not a thermoset polymer, not an ionic polymer, not a thermoplastic elastomer, and not a hydrogel, or more specifically non-petroleum-based, glycerin-based, propylene glycol-based, or a combination thereof.

The proppant may be a raw substrate, including sand, ceramic, or composite material, composites, minerals, ground shells, resin coated proppants, or combinations thereof. The chemical coating may be glycerin-based coating, vegetable oil/wax-based coating, tall oil pitch based coating, alkyl ester based coating, or a combination thereof. The coating may not be an ionic polymer. The coating may be less than 2 wt. % of the surface modified proppant, less than 1 wt. % of the surface modified proppant, or 0.05 to 0.20 wt. % of the surface modified proppant.

The chemical coating may be applied to the proppant through mechanical mixing, spray, non-mechanical mixing, or a combination thereof. The coating may comprise multiple coatings applied simultaneously or sequentially onto the proppant. The multiple coatings may comprise a first coating and a second coating and the first coating may have a different chemical composition than the second coating or the chemical composition of the first coating may be the same as the chemical composition of the second coating. The coating may be applied to the proppant prior to the proppant being used.

The surface modified proppant may further comprise a chemical marker, such as a colorant, a UV dye, a conductivity enhancing chemical, or a combination thereof. The surface modified proppant may further comprise a frac fluid delay-crosslinking agent, which may be betaine, gluconate, polyglycol, or a combination thereof.

BRIEF DESCRIPTION OF THE DRAWINGS

FIG. 5a is a close-up of a portion of the diagram of FIG. 5;

Other advantages and features will be apparent from the following description and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

In general, in a first aspect, the invention relates to an attrition resistant proppant composite and its composition matters. In testing, a thick layer, a thin layer, or partial covering of glycerin-based coating, vegetable oil-based coating, or tall oil pitch based coating surprisingly was able to increase the attrition/impingement resistance of the surface modified proppant and was able to greatly reduce the respirable dust/fines level upon pneumatic air unloading of such a surface modified proppant composite. Such a discovery is significant in protecting the workers who are exposed to proppant dust. The green and sustainable nature of such chemical coatings also is able to better protect our environment and water resources.

In addition to worker safety issues related to OSHA compliance and NIOSH guidelines for airborne particulate matter, the proppant composite may be used downhole in the hydraulic fracturing context. The material may also be used as further described below as an industrial, construction, or playground sand or in similar contexts. The green and sustainable nature of the chemical coating is important. It can avoid the contamination of water either in above ground collection areas (such as ponds, streams, or runoff from a site) as well as groundwater. In addition to OSHA and NIOSH, it is possible that the U.S. Environmental Protection Agency (EPA) or other agencies will introduce regulations that encourage, or require, the use of biologically and environmentally friendly materials like the surface modified proppants described herein.

Figure 3:
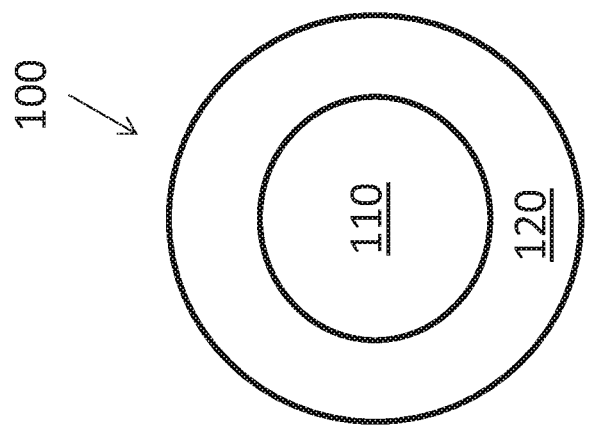
FIG. 3 shows a cross section of a surface modified proppant for use in a fracturing process, where the surface modified proppant has a partial coating.
Figure 2:
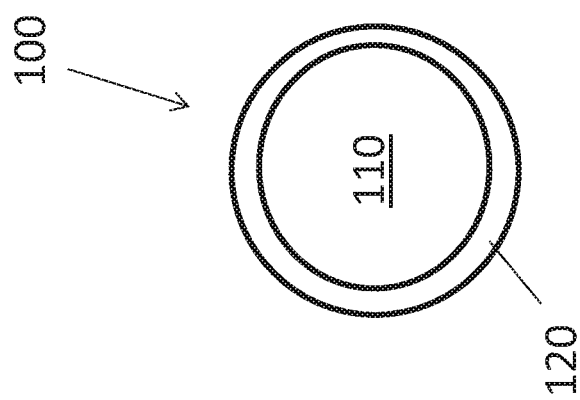
FIG. 2 shows a cross section of a surface modified proppant for use in a fracturing process, where the surface modified proppant has a thin coating.
Figure 1:
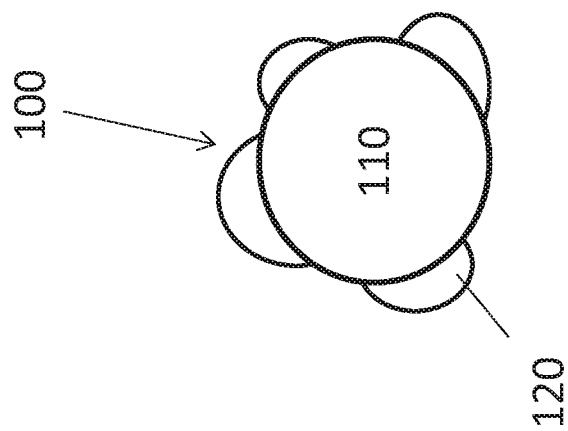
FIG. 1 shows a cross section of a surface modified proppant for use in a fracturing process, where the surface modified proppant has a thick coating.

The proppant may be a surface modified proppant for use in a fracturing process. A cross section of the proppant may be seen in FIGS. 1, 2, and 3. The modified proppant 100 may offer low dust/fines upon shipping and handling and upon pneumatic air unloading at the fracturing job site. Environmentally friendly chemicals/coatings 120 such as glycerin-based coating formula, vegetable oil-based formula, or tall oil pitch based coating formula may be employed to modify the proppant. The proppant 110 may be sand, such as quartz sand, resin-coated quartz sand, beach sand, golf sand, coral sand, volcanic ash, glass sand, gypsum sand, Ooid sand, silica sand, black sand, green sand, desert sand, lithic sand, biogenic sand, garnet sand, olivine sand, heavy mineral sand, continental sand, quartz sand, or other types of sand; or ceramics, materials used to make ceramics such as bauxite, light weight ceramics, or resin-coated ceramics, typically used in the fracturing industry, or other suitable particulate materials such as ground quartz, ground shells, etc. The surface modified low-dust generating composite system can also be applied to other dust generating particulates like talc, feldspar, diatomite, kaolin, ground quartz, beach sand, playground sand, fume silica, golf course sand, etc. The proppant 110 is shown as round or spherical in FIGS. 1, 2, and 3, but may be of any geometric shape without departing from the present invention.

The chemical coating 120 may not be a thermoset polymer, an ionic polymer, a thermoplastic elastomer, or a hydrogel. The chemical coating 120 may be non-petroleum based, glycerin-based, propylene glycol-based, or a combination thereof. More particularly, the chemical coating may be glycerin-based, vegetable oil based, tall oil pitch based, methyl and/or ethyl ester based, or a combination thereof, or may be mineral oil or other suitable coating. The coating may not be an ionic polymer, where an ionic polymer includes polyanionic and polycationic polymers, including synthetic polymer, biopolymer, or modified biopolymer comprising carboxy, sulfo, sulfato, phosphono, or phosphate groups or a mixture thereof or a salt thereof, or primary, secondary, or tertiary amines or quaternary ammonium groups or suitable salt thereof in the backbone or as substituents. The chemical coating may be environmentally friendly and may be non-toxic to humans and/or animals. The coating may not require curing or drying. The coating 120 may not be an additive or secondary coating used in conjunction with a different coating for a different purpose, but may be used alone as a primary coating element.

Petroleum-based coatings or treatments may alter the environmental friendliness and toxicity profile of the modified proppant system, including as to airborne dust/fines in handling the material prior to its downhole introduction as well as residual environmental contamination following downhole application. By way of non-exhaustive exclusion, the modified proppant 100 may not include a petroleum-based coating other than glycerin or propylene glycol, a surface hydrogel layer, synthetic polymer layer, silane functional agent layer, synthetic resin layer, thermoplastic elastomer, or other coating based on a petroleum fraction or a polymer made from a petroleum fraction monomer. Other coatings excluded from the present invention include tackifying agents including polyamides and polyacids, organic coatings of the variety of thermoplastic elastomers or thermosetting polymers, polyurethane, cured isocyanate functional components, glycerol rosin ester or pentaerythritol rosin ester, phenol-aldehyde novolac polymer, polycarbodiimide, epoxy, or viscoelastic surfactants. Such additional or alternative coatings are sometimes used to suspend a proppant in a slurry, deliver a proppant into a fracture, encourage conductivity (i.e., in this context the flow of hydrocarbons, not electricity), withstand structural pressure (i.e., crush strength), or for other downhole purposes. It is possible that the modified proppant 100 of the present invention may be used in combination with these other material systems to address multiple competing concerns in a hydraulic fracturing or related context or for other downhole purposes (i.e., to reduce the flowback of proppant).

The coating may be applied prior to the use of the proppant. Thus, the coating may be applied to new, substantially dust-free proppant. As such, the coating may primarily prevent dust formation by preventing proppant attrition rather than merely suppressing existing dust. Given a proppant with a particular particle size, uncoated proppant may break apart during shipping, handling, and other use. The coated proppant may maintain the same particle size, with the coating preventing the proppant particles from breaking. This coated proppant may be distinguished from a coating applied to dusty aggregate to agglomerate the existing dust and prevent the existing dust from becoming airborne. Proppant may be considered substantially dust free if it has a turbidity of less than 200, preferably less than 150, more preferably less than 100, and most preferably less than 50. Turbidity is the cloudiness or haziness of a fluid caused by suspended solids that may be invisible to the naked eye. Dust/fines suspended in water are similar in particle size to respirable dust particles that may present breathing hazards. Substantially dust free proppant may be proppant produced at a sand mine where the sand was washed, dried, screened, and optionally stored in a silo. The turbidity of the proppant may depend on the grade. For example, samples of 40/70 and #100 grades may have a higher turbidity than samples of 20/40 and 16/30 grades, even when all of the samples are substantially dust free.

In a laboratory setting, the coating may be applied by dropwise addition of the coating to 200 g of a chosen particulate material at room temperature. The coating and proppant may be well mixed by hand with a stainless spatula for five minutes until the coating is well distributed to the proppant. Alternately, the mixing can be accomplished by other well-known mechanical mixing methods.

Figure 4:
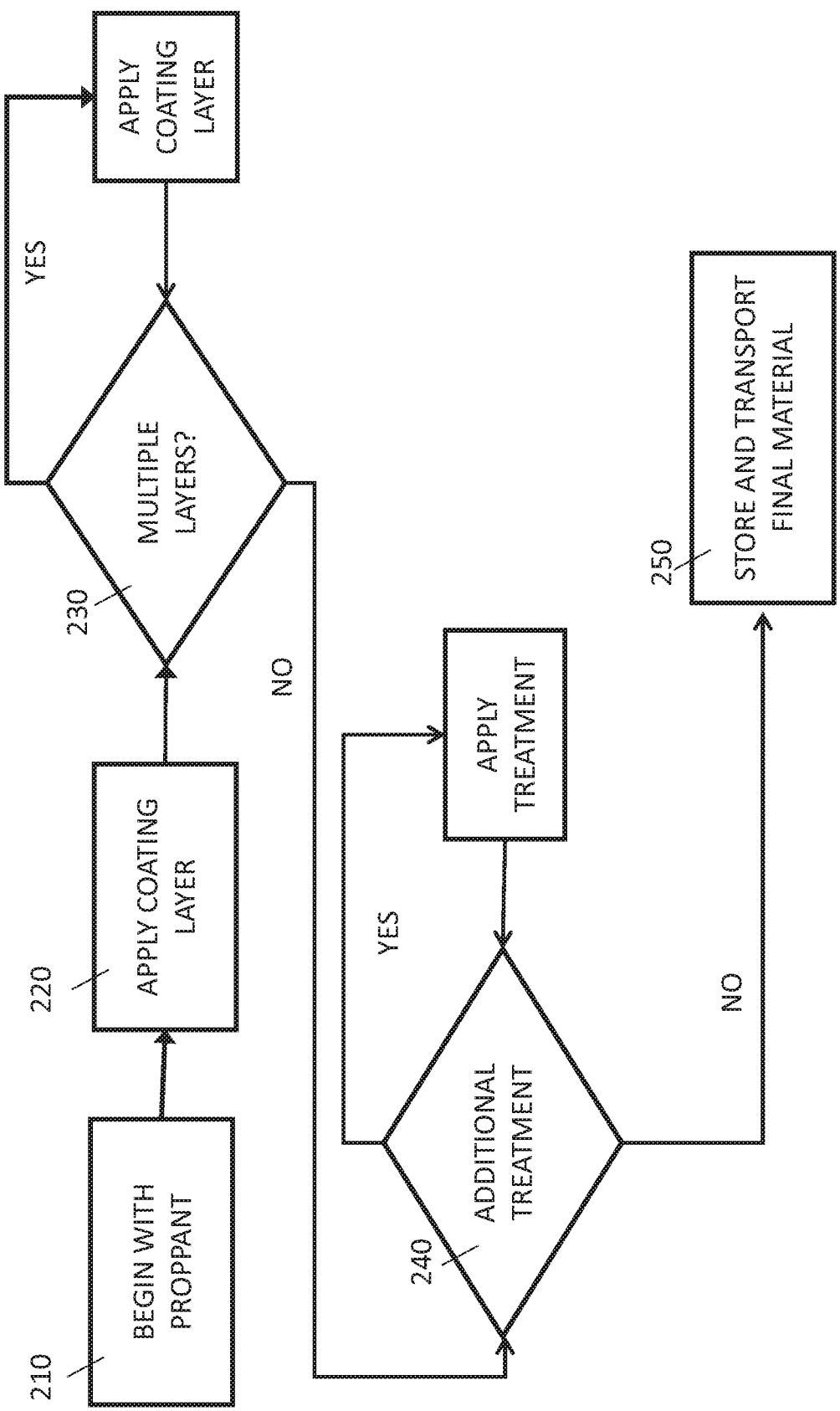
FIG. 4 is a flow chart for a process for making a surface modified proppant at scale.

FIG. 4 is a flow chart for a process for making a surface modified proppant at scale. The process may begin with the precursor material, the proppant 110, in Step 210. A first layer of the chemical coating 120 may then be applied in Step 220. For industrial use, the coating may be applied using spray, a powered continuous mechanical blender, a powered batch mechanical blender, a static mixer, or a combination thereof, or using other mixing or application methods as desired. After application, the chemical coating 120 may be less than 2 wt. % of the surface modified proppant 100, less than 1 wt. % of the surface modified proppant 100, or most preferably 0.05 to 0.20 wt. % of the surface modified proppant 100.

When a powered continuous mechanical blender is used in Step 220, the powered continuous mechanical blender may have rotating shaft-mounted paddles, pins, a ribbon or ribbons, or any combination thereof and may be powered with a motor, engine, or other drive system. Additionally or alternately, a rotating drum or other vessel, which may comprise mixing flights, buckets, plates, dams, etc., may be utilized. The coating may be applied to the proppant upstream of the powered continuous mechanical blender, or during entry of the proppant into the powered continuous mechanical blender, or immediately after the proppant enters the powered continuous mechanical blender. The coating application point may be configured in such a way to establish a falling curtain pattern of proppant flow where the coating is applied to allow for more efficient distributive application of the coating. Alternately or additionally, a spray nozzle system may be utilized for more efficient distributive application of the coating. The rotating paddles, pins, and/or ribbons may facilitate mixing of the proppant and coating and may convey the coated proppant to the discharge end of the powered continuous mechanical blender. The powered continuous mechanical blender may have a single rotating shaft or may have two or more rotating shafts. This may result in a continuous-process blending procedure to facilitate even spreading of the coating product onto the proppant. Alternately, the belts, drops, and conveying at a sand plant or a transloader, or at any site that conveys the sand, may provide adequate if not optimal mixing of the coating.

A powered batch mechanical blender may use a motor, engine, or other drive system to facilitate mixing the proppant and coating. The coating may be applied to the proppant upstream of the powered batch mechanical blender, or during entry of the proppant into the powered batch mechanical blender, or immediately after the proppant enters the powered batch mechanical blender. The coating application point may be located or configured in such a way to establish a falling curtain pattern of proppant flow where the coating is applied to allow for more efficient distributive application of the coating. Alternately or additionally, a spray nozzle system may be utilized for more efficient distributive application of the coating. The rotating paddles, pins, and/or ribbons may facilitate mixing of the proppant and coating. The powered batch mechanical blender may have a single rotating shaft or may have two or more rotating shafts. After blending, the coated proppant may exit the powered batch mechanical blender and the process may be repeated. This may result in a batch-process blending procedure to facilitate even spreading of the coating product onto the proppant.

A static mixer may use non-powered means to mix the proppant and coating. Proppant may be gravity-fed through the static mixer. The coating may be applied to the proppant upstream of the static mixer, or during entry of the proppant into the static mixer, or immediately after the proppant enters the static mixer. The coating application point may be located or configured in such a way to establish a falling curtain pattern of proppant flow upstream of the static mixer, at the feed end of the static mixer, or immediately after proppant enters the static mixer to allow for more efficient distributive application of the coating. Alternately or additionally, a spray nozzle system may be utilized for more efficient distributive application of the coating. Baffles, diverters, plates, ladder rungs, etc. may be installed inside the static mixer to facilitate mixing of the proppant and coating. This may result in a continuous-process blending procedure to facilitate even spreading of the coating product onto the proppant.

In Step 230, a decision point may be reached where additional coating layers may be applied, if desired. Each coating may be applied sequentially onto the aggregate. Each of the multiple coatings may be a layer of the same type of coating, or each layer may be a different type of coating, or a combination thereof. Each layer of coating may be applied using any one or more of the application processes described above in Step 220.

In Step 240, a decision point may be reached where one or more additional chemical modifications may be performed on the modified proppant. Chemical markers like colorants, UV dyes, and conductivity enhancing chemicals and/or biological markers such as DNA may also be added to the proppant composite for the purpose of easy identification, tracking, or other purposes. Additionally or alternately, a frac fluid delay-crosslinking agent, such as betaine, gluconate, polyglycol, or a combination thereof, may be added. These chemicals may also be applied as a mixture with the anti-attrition coating and be applied in Step 220 and/or 230.

In Step 250, the modified proppant produced through the above process may be stored and thereafter transported for use at a hydraulic fracturing site. It may also be possible to perform this process in situ or anywhere in the supply chain, even including on demand at the hydraulic fracturing site. The material system, though, will show substantially improved dust control and attrition resistance performance over untreated proppants and even proppants treated with alternative chemical systems.

Figure 5:
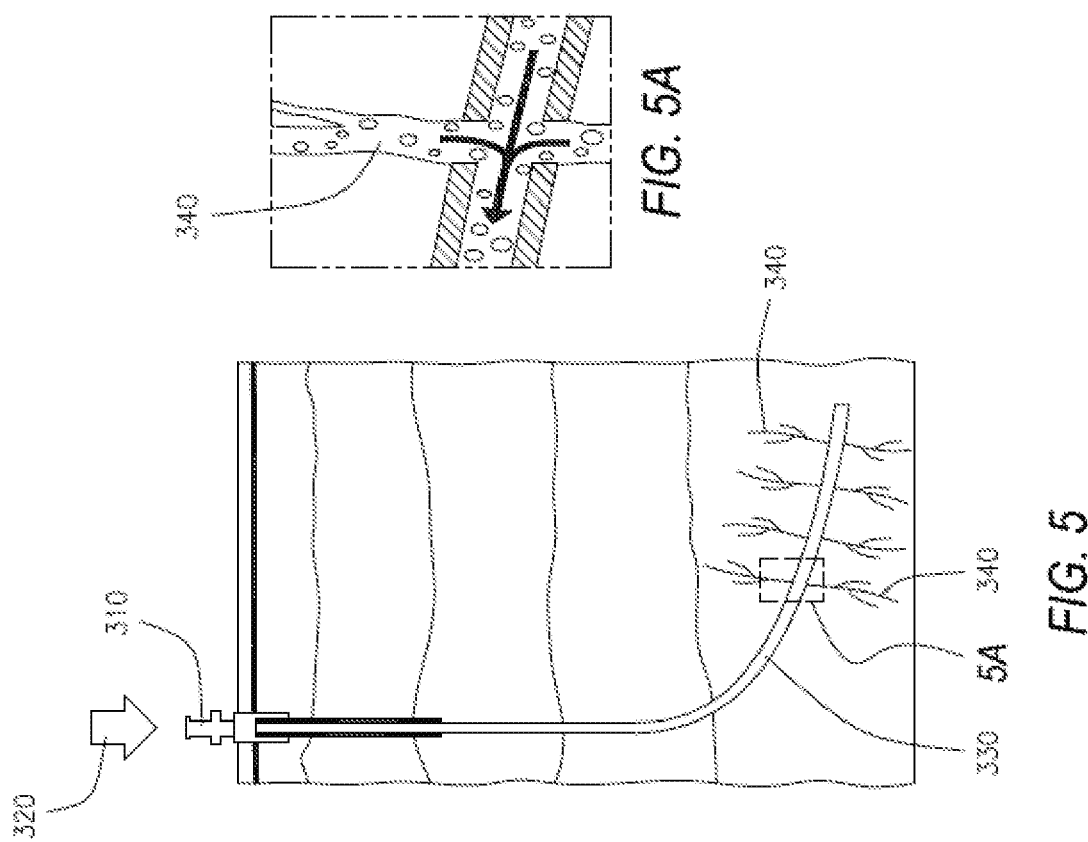
FIG. 5 is a diagram of the use of a modified proppant in hydraulic fracturing.

FIG. 5 is a diagram of the use of a surface modified proppant in hydraulic fracturing. Hydraulic fracturing is commonly used in oil and gas production to maximize output from a wellbore 310. The process involves injecting a highly pressurized fluid 320, typically containing water, chemicals, and proppants, into a wellbore 310, which causes the underlying rock to crack. The proppants in the fluid then stay in the cracks in the rock and hold open the cracks, or fissures 340. Hydraulic fracturing is frequently used in combination with horizontal drilling 330. By creating fissures 340 and filling them with materials (including the modified proppant of the present invention) to keep the fissures open, underlying hydrocarbons flow through the fissures into the wellbore for collection. Back in Step 220 of the process to make the modified proppant, the chemical coating 120 will not impede the flow of the modified proppant 100 as part of the highly pressurized fluid 320. The chemical coating 120 and resulting modified proppant 100 may also be compatible with the highly pressurized fluid 320, also called frac fluid.

While the composite is particularly suited for use as a proppant in hydraulic fracturing, it may be used in other applications in which low dust/fines is desirable. For example, such a coating may be applied to create a low-dust, attrition-resistant composition for industrial sand (e.g., for use in glass, foundry, paint, construction applications), recreational sand (e.g., for use in playground, golf course applications), or for other minerals or powders.

The embodiments of this invention described herein are mainly to illustrate basic chemistries that could be employed to prepare a proppant composite with attrition resistance for achieving low proppant dust/fines and low respirable proppant dust/fines upon shipping and handling, and especially upon pneumatic air unloading of such a proppant composite at a fracturing job site and/or upon use of other powder conveying, storage, or handling equipment. The chemistries employed in this invention are chemicals that may be safe to humans and safe to aquatic species. Furthermore, these safe chemicals employed in this invention are also dominantly green and sustainable.

The following examples, used as illustration but not limitation, describe particular embodiments of the present invention.

Figure 6:
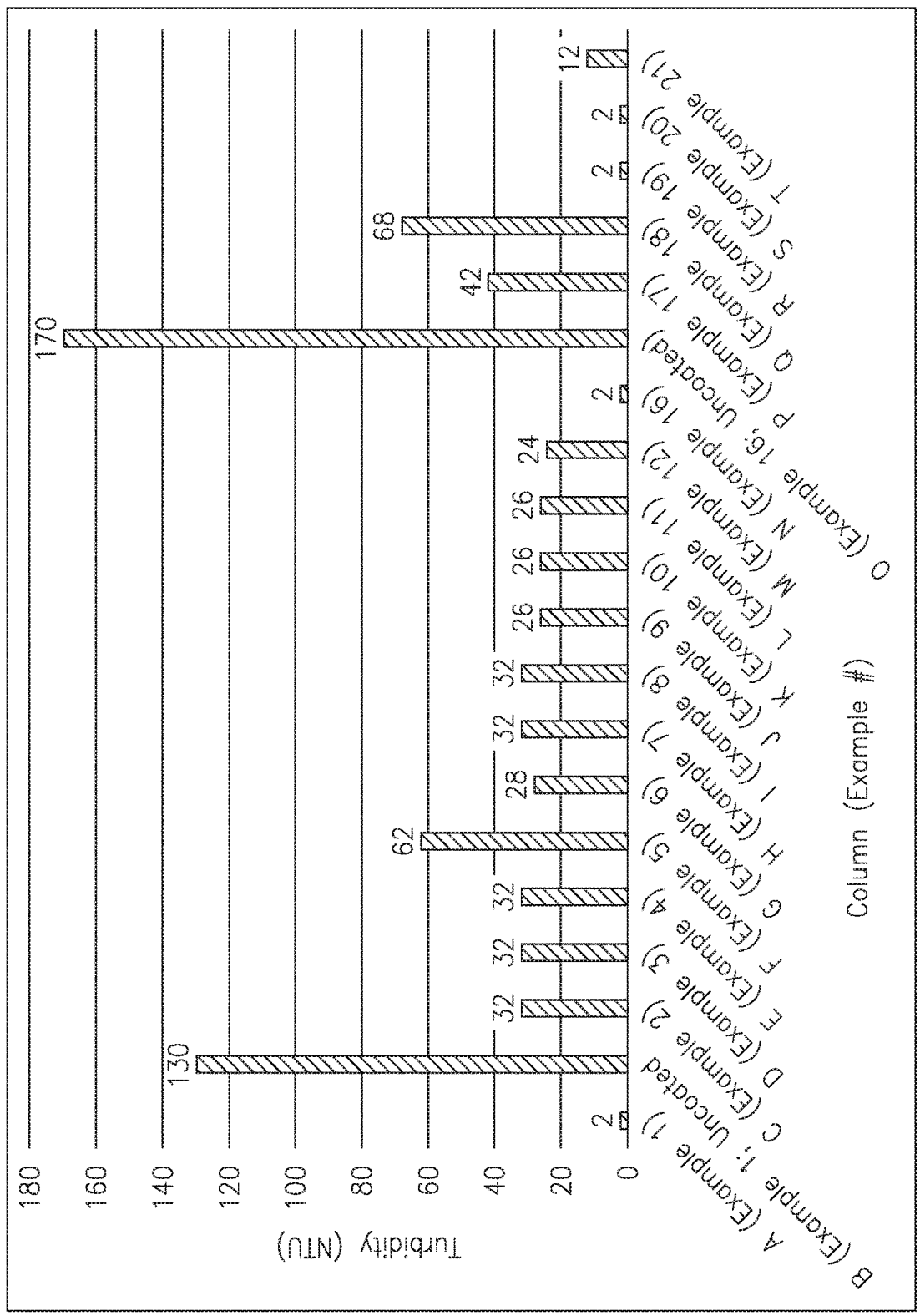
FIG. 6 is a chart showing the reduction in dust/fines generation during abrasion/attrition, as measured by turbidity, of the surface modified proppants described in Examples 1 through 12 and 16 through 21.

Example 1. Conventional northern white quartz frac sand (20/40) was treated with tall oil pitch at a level of 0.1 wt % of the frac sand. The surface temperature of the frac sand was 70 C and the temperature of the tall oil pitch was at 70 C or higher. The frac sand and tall oil pitch coating were well mixed mechanically to achieve even coverage of tall oil pitch on frac sand particulates. The finished product, a frac sand composite with tall oil pitch covering the surface of the frac sand particulate, was then placed in a ball mill for a six-hour grinding at ambient temperature to simulate real world conditions during a typical shipment of the sand. The turbidity of the ground product was then measured based on ISO 13503-2:2006E Section 9. The turbidity, 2 NTU, is shown in A) of FIG. 6. Un-coated frac sand was also put through this grinding process as described in this example, and its turbidity after the grinding was determined by the same ISO 13503-2:2006E Section 9 testing protocol. The turbidity, 130 NTU, is shown in B) of FIG. 6 to serve as a control.

Example 2. As described in Example 1, a tall oil pitch and yellow grease blend (50/50) was used to treat the frac sand at a level of 0.1 wt. % of the frac sand. The turbidity after the six-hour grinding, 32 NTU, is shown in C) of FIG. 6.

Example 3. Glycerin was used to treat the frac sand as described in Example 1 at 0.15 wt. % of the frac sand. Both frac sand and glycerin were at ambient temperature. The turbidity after the six-hour grinding, 32 NTU, is shown in D) of FIG. 6.

A six-hour abrasion study was also conducted, which showed there was a significant difference in turbidity between the uncoated sand and coated sand. Additional testing was done to ensure that the noticed difference in turbidity was not an artifact of the test protocol. This testing was meant to demonstrate that the observed reduction in fines was due to reduced attrition rather than embedding of fines in the coating.

In this study, the quantity of glycerine present in the water sample used in the turbidity test was measured. The data showed that the coated 0.15 wt. % of glycerin was entirely removed from the surface of the coated sand. Therefore, the reduction in turbidity was due to reduced attrition rather than to capturing of dust/fines by the coating.

Further testing was done to demonstrate that the glycerin itself was not reducing the turbidity by, for example, agglomerating fines. In this study, we also ran one test where we purposely added into the water phase glycerin at a typical coating dosage and checked if the turbidity of the uncoated frac sand after six-hour abrasion was affected by the presence of the glycerin. Our study showed that the addition of glycerin into the water phase at a typical coating dosage resulted in no change in the turbidity. Again, it pointed toward the fact that glycerin coating did improve the attrition resistance of a proppant.

Example 4. As described in Example 3, a glycerin/water blend (67/33) was used to treat the frac sand at 0.15 wt. % of the frac sand. The turbidity after the six-hour grinding, 32 NTU, is shown in E) of FIG. 6.

Example 5. As described in Example 3, a glycerin/water blend (50/50) was used to treat the frac sand at 0.15 wt. % of the frac sand. The turbidity after the six-hour grinding, 62 NTU, is shown in F) of FIG. 6.

Example 6. As described in Example 3, an industrial grade glycerin/water blend (67/33) was used to treat the frac sand at 0.15 wt. % of the frac sand. The turbidity after the six-hour grinding, 28 NTU, is shown in G) of FIG. 6.

Example 7. As described in Example 3, a crude glycerin/water blend (67/33) was used to treat the frac sand at 0.15 wt. % of the frac sand. The turbidity after the six-hour grinding, 32 NTU, is shown in H) of FIG. 6.

Example 8. As described in Example 3, a glycerin/water/propylene glycol blend (60/30/10) at 0.15 wt. % of the frac sand was used to treat the frac sand. The turbidity after the six-hour grinding, 32 NTU, is shown in I) of FIG. 6.

Example 9. As described in Example 3, a glycerin/water/ethylene glycol blend (60/30/10) at 0.15 wt. % of the frac sand was used to treat the frac sand. The turbidity after the six-hour grinding, 26 NTU, is shown in J) of FIG. 6.

Example 10. As described in Example 3, a glycerin/water/betaine blend (60/30/10) at 0.15 wt. % of the frac sand was used to treat the frac sand. The turbidity after the six-hour grinding, 26 NTU, is shown in K) of FIG. 6.

Example 11. As described in Example 3, a propylene glycol/water blend (67/33) was used to treat the frac sand at a dosage of 0.15 wt. % of the frac sand. The turbidity after the six-hour grinding, 26 NTU, is shown in L) of FIG. 6.

Example 12. As described in Example 3, a glycerin/water/propylene glycol/ethylene glycol/betaine blend (60/30/4/3/3) was used to treat the frac sand at a dosage of 0.15 wt. % of the frac sand. The turbidity after the six-hour abrasion, 24 NTU, is shown in M) of FIG. 6.

Figure 7:
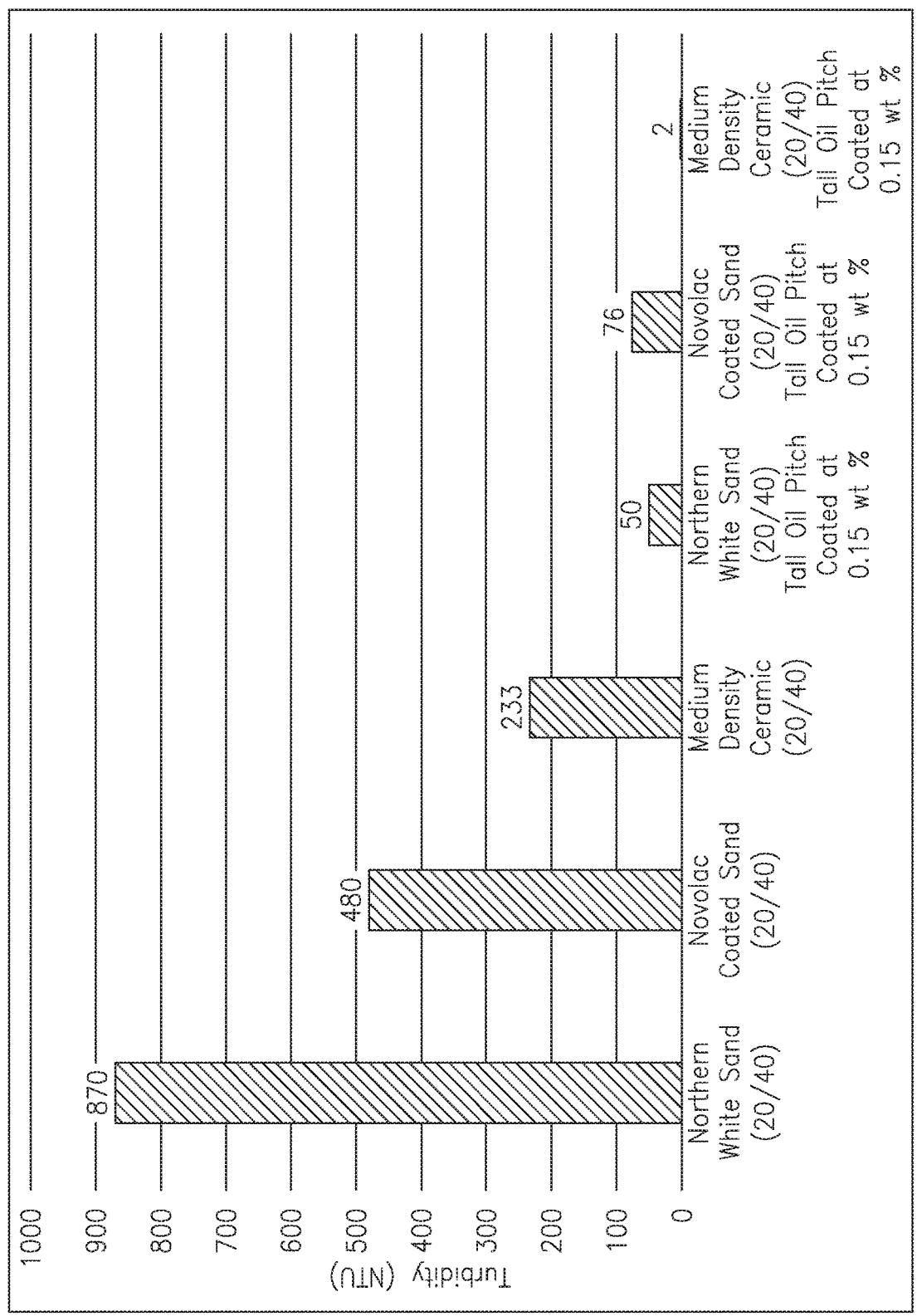
FIG. 7 is a chart showing the reduction in dust/fines generation during abrasion/attrition, as measured by turbidity, in a 12.5 hour ball mill abrasion test.

Example 13. Novolac resin coated frac sand (20/40) was coated with tall oil pitch at 0.15 wt. % dosage. Both the substrate and the coating temperatures were at 70 C. After cooling down, the coated resin-coated frac sand and the un-coated resin-coated frac sand were subjected to 12.5 hours of ball milling. The turbidities of both ball-milled proppants are shown in FIG. 7. The tall oil pitch coated resin-coated frac sand greatly reduced the turbidity of the resin-coated frac sand from 480 NTU to 76 NTU. Upon the same 12.5 hour ball milling, similar high degree of reduction in the turbidity of the tall oil pitch coated northern white sand (20/40; 0.15 wt. % dosage) from 870 NTU (uncoated sand) to 50 NTU was also noticed, as shown in FIG. 7.

Example 14. Medium density ceramic (aluminum oxide) proppant was treated with tall oil pitch at 0.15 wt. % dosage. Both the substrate and the coating temperatures were at 70 C. After cooling down, the coated ceramic proppant and the un-coated ceramic proppant were subjected to 12.5 hours of ball milling. The turbidities of both ball-milled proppants are shown in FIG. 7. The tall oil pitch coating was able to reduce the turbidity of the ceramic proppant from 233 NTU to about 2 NTU.

Figure 8:
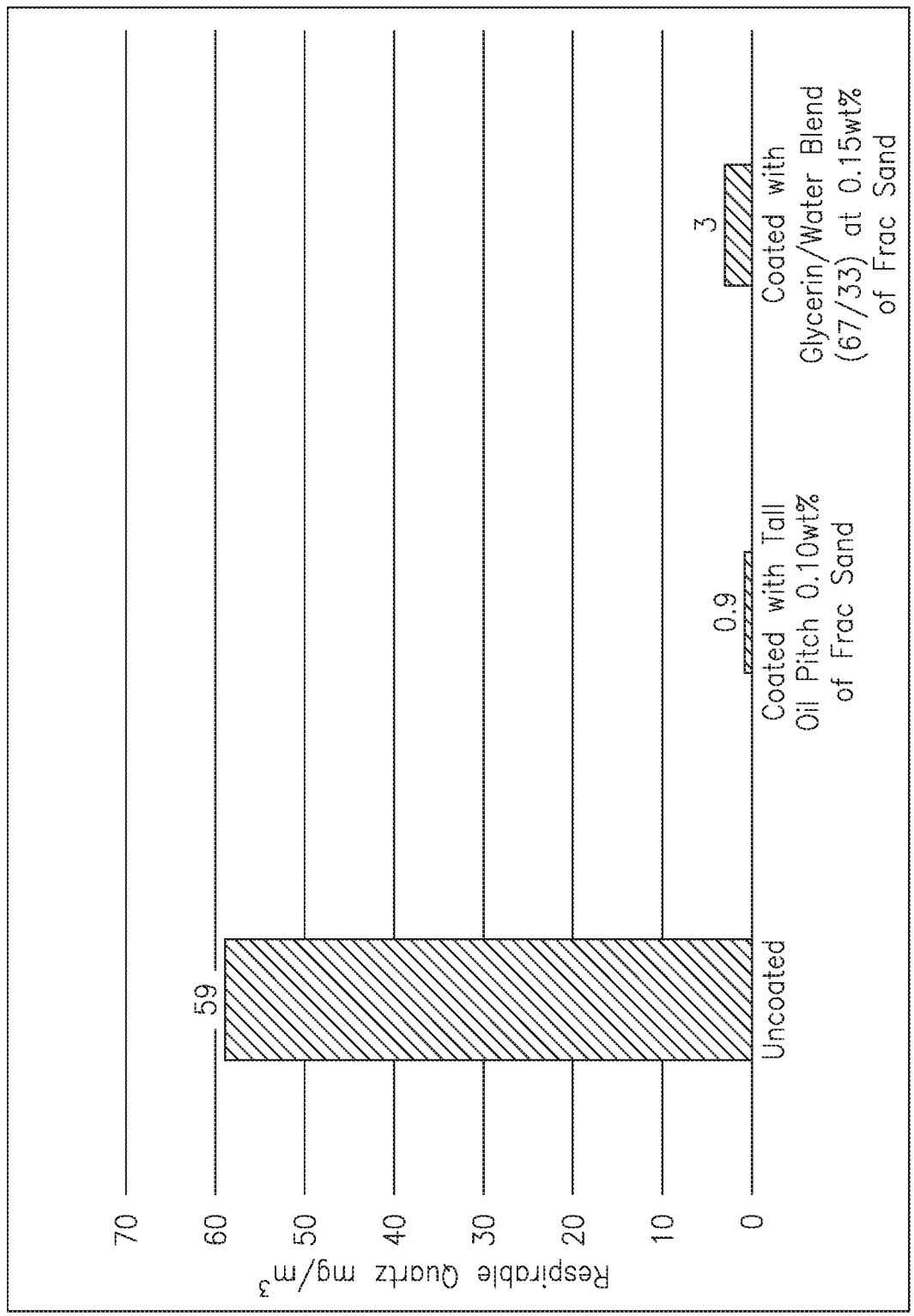
FIG. 8 is a chart showing the respirable quartz dust levels of uncoated frac sand and coated frac sand upon pneumatic air unloading.

Example 15. The uncoated frac sand and the coated frac sand as described in Example 1 and Example 4 were used for a pneumatic air unloading in a scaled down study. The scaled down study was conducted at about 12.5 lbs/min sand pumping rate at 15 psi in a closed direct stream box. Samples in the middle of the uprising dust stream were collected on 3-piece, 37 mm, pre-weighted PVC filter cassettes for a combination of gravimetric and XRD analysis. A cyclone was used to collect particulates in the respirable fraction. These collected samples were analyzed for respirable quartz particulates, including quartz, and tridymite, and additional respirable particulates (not just the silica fraction), based on the modified NIOSH 0600/7500 and OSHA ID-142 methods. The respirable quartz dust levels are shown in FIG. 8. Un-coated frac sand generated very high levels of respirable quartz dust, while the coated frac sands in this invention generated respirable quartz dust levels at least 94% lower than that of the uncoated frac sand. This closed direct stream box test was a very stringent test compared to a real job site situation where respirable quartz dust in the air is typically much more diffused before it goes toward the workers.

Example 16. As described in Example 1, conventional northern white quartz frac sand (#100, or 70/140) was treated with tall oil pitch coating at 0.15 wt. % of the frac sand. The temperatures of both the frac sand and tall oil pitch coating were at 100 C. The frac sand and tall oil pitch coating were well mixed mechanically to achieve even coverage of tall oil pitch on frac sand particulates. The finished product, a frac sand composite with tall oil pitch covering the surface of the frac sand particulate, was then placed in a ball mill for a six-hour grinding at ambient temperature. Uncoated quartz frac sand (#100, or 70/140) was also placed in a ball mill and ground for six hours. The turbidities of both ground samples, 2 NTU and 170 NTU, respectively, are shown in N) and O) in FIG. 6.

Example 17. As described in Example 1, conventional northern white quartz frac sand (20/40) was treated with tall oil pitch coating at 0.10 wt. % of the frac sand. The temperatures of both the frac sand and tall oil pitch coating were at 70 C. The frac sand and tall oil pitch coating were well mixed mechanically to achieve even coverage of tall oil pitch on frac sand particulates. The finished product, a frac sand composite with tall oil pitch on frac sand particulates, was further coated with a glycerin based coating (67/33 glycerin/water blend) at 0.025 wt. % and mixed well mechanically at 70 C. The finished product was then placed in a ball mill for a six-hour grinding at ambient temperature. The turbidity of the ground sample, 42 NTU, is shown in P) in FIG. 6.

Example 18. As described in Example 17, conventional northern white quartz frac sand (20/40) was treated with tall oil pitch coating at 0.50 wt. % of the frac sand. The temperatures of both the frac sand and tall oil pitch coating were at 70 C. The frac sand and tall oil pitch coating were well mixed mechanically to achieve even coverage of tall oil pitch on frac sand particulates. The finished product, a frac sand composite with tall oil pitch on frac sand particulates, was further coated with a glycerin based coating (67/33 glycerin/water blend) at 0.025 wt. % and mixed well mechanically at 70 C. The finished product was then placed in a ball mill for a six-hour grinding at ambient temperature. The turbidity of the ground sample, 68 NTU, is shown in Q) in FIG. 6.

Example 19. Conventional northern white sand (20/40) was treated with a crude soybean oil/soybean oil wax blend (80/20 blend) at 0.50 wt. % of the frac sand. The frac sand and crude soybean oil/soybean wax blend coating were well mixed mechanically at 70 C to achieve even coverage of the crude soybean oil/soybean wax coating on frac sand particulates. The product was then further coated with a glycerin/water (67/33 blend) coating at 0.025 wt. % and mechanically well mixed at 70 C. The finished product, a frac sand composite with coating covering the surface of the frac sand particulates, was then placed in a ball mill for a six-hour grinding at ambient temperature. The turbidity of the ground sample, 2 NTU, is shown in R) in FIG. 6.

Example 20. Conventional northern white sand (70/140) was treated with a tall oil pitch coating at 0.10 wt. % of the frac sand. The frac sand and the coating were well mixed mechanically at 70 C to achieve even coverage of the coating on frac sand particulates. The product was then further coated with a glycerin/water (67/33 blend) coating at 0.025 wt. % and mechanically well mixed at 70 C. The finished product, a frac sand composite with coating covering the surface of the frac sand particulates, was then placed in a ball mill for a six-hour grinding at ambient temperature. The turbidity of the ground sample, 2 NTU, is shown in S) in FIG. 6.

Example 21. Conventional northern white sand (20/40) was treated with a methyl oleate coating at 0.10 wt. % of the frac sand. The frac sand and the coating were well mixed mechanically at ambient temperature. The finished product was then placed in a ball mill for a six hour grinding at ambient temperature. The turbidity of the ground sample, 12 NTU, is shown in T) in FIG. 6.

Figure 9:
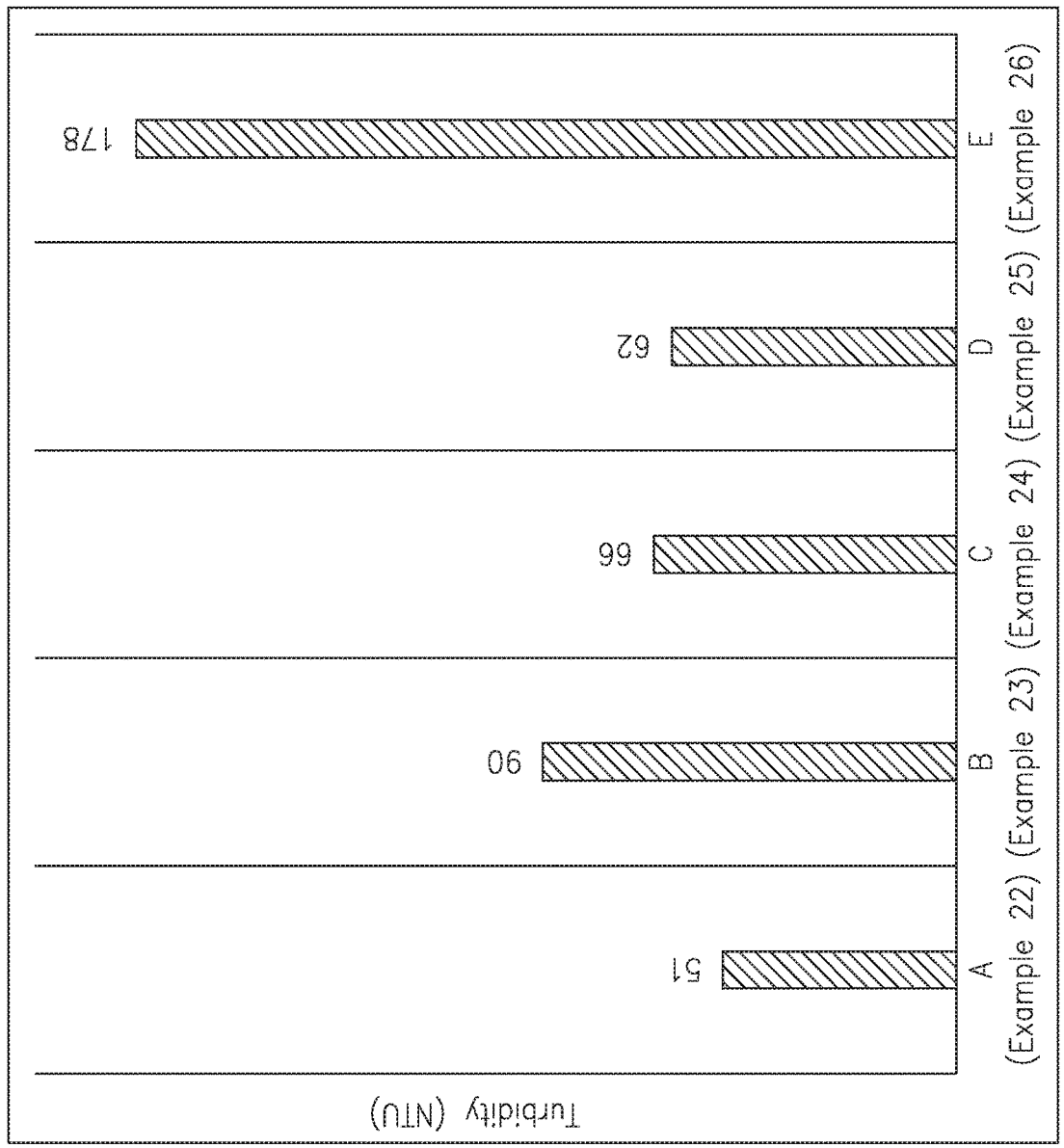
FIG. 9 is a chart showing the dust/fines reduction, as measured by turbidity, of the surface modified proppants described in Examples 22 through 26.

Example 22. Conventional northern white sand (40/70) was heated up to 100 C and then treated with glycerin/water (67/33; pre-mixed) at 0.125 wt. % of the frac sand. Product was then mechanically mixed and placed in a ball mill for six-hour grinding at ambient temperature. The turbidity of the ground sample is listed as A in FIG. 9.

Example 23. As described in Example 22, the 40/70 hot sand was treated simultaneously with separate additions of glycerin at 0.084 wt. % and water at 0.041 wt. % of the frac sand. After mechanical mixing, the finished product was then placed in a ball mill for six hour grinding at ambient temperature. The turbidity of the ground sample, 09 NTU, is listed as B in FIG. 9.

Example 24. As described in Example 22, the 40/70 hot sand was treated first with glycerin at 0.084 wt. % of the frac sand. After mechanical mixing, the system was then further treated with water at 0.041 wt. % of the frac sand. After mechanical mixing, the finished product was then placed in a ball mill for six hour grinding at ambient temperature. The turbidity of the ground sample, 66 NTU, is listed as C in FIG. 9.

Example 25. As described in Example 22, the 40/70 hot sand was treated with water at 0.041 wt. % of the frac sand. After mechanical mixing, the system was then further treated with glycerin at 0.084 wt. % of the frac sand. After mechanical mixing, the finished product was then placed in a ball mill for six hour grinding at ambient temperature. The turbidity of the ground sample, 62 NTU, is listed as D in FIG. 9.

Example 26. As described in Example 22, the 40/70 hot sand without any chemical treatment was then placed in a ball mill for six hour grinding at ambient temperature. The turbidity of the ground sample, 178 NTU, is listed as E in FIG. 9.

Figure 10:
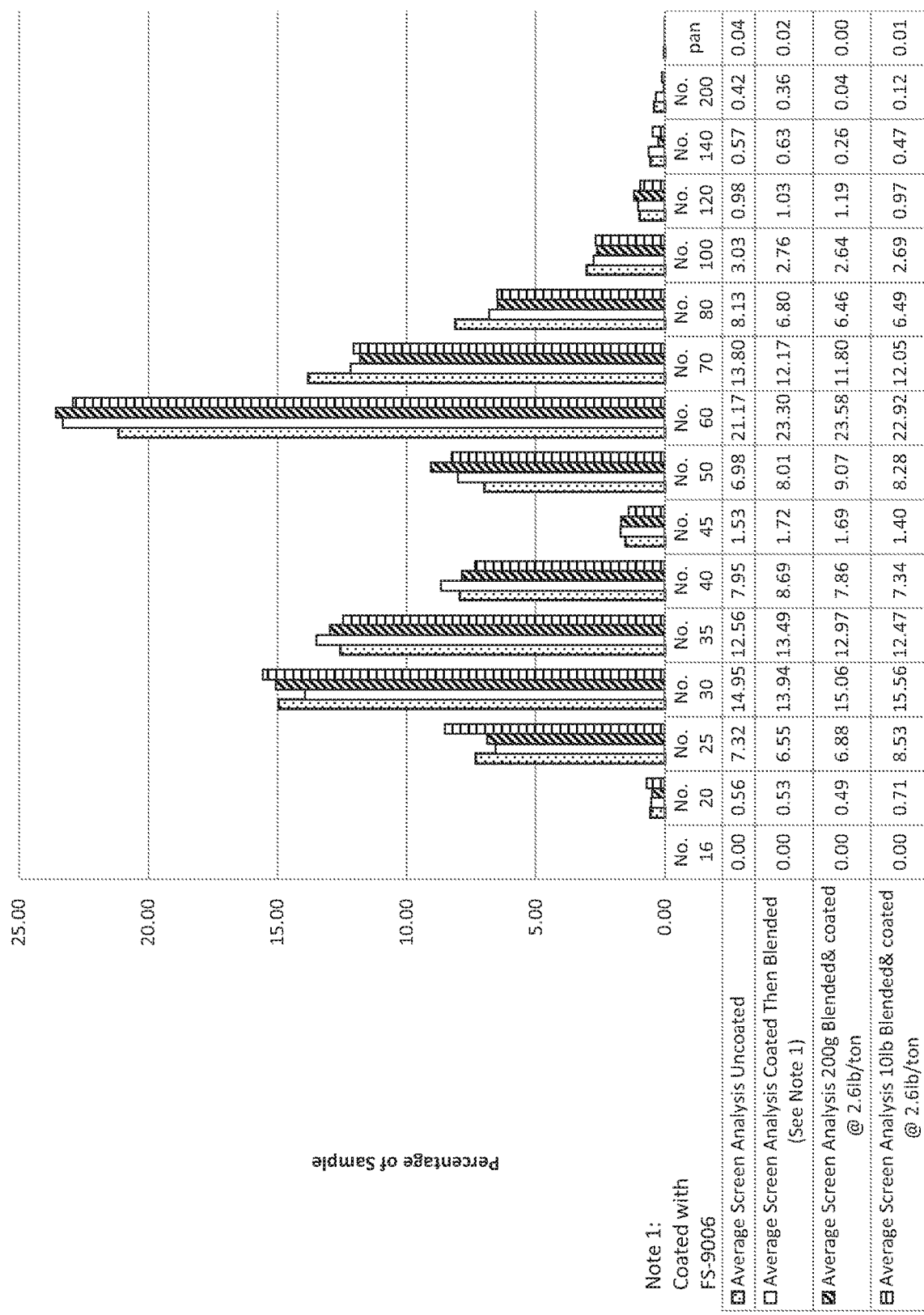
FIG. 10 is a chart showing the particle size distribution of the systems described in Example 28.

Example 27. As described in Example 22, pre-blended hot (100 C) frac sand (45 wt. % of 20/40, 45 wt. % of 40/70 and 10 wt. % of 70/140) was treated with glycerin/water (67/33) coating at 0.13 wt. %. Upon cooling down, the treated frac sand was screened and the wt. % of each screen size was recorded. Two batch sizes were studied: 200 g pre-blended frac sand and 10 lb pre-blended frac sand. The pre-blended frac sand (uncoated) and the pre-blended coated frac sand (coated first before blending) were also screened to provide background data regarding particle size distributions. The particle size distributions of these four systems is shown in FIG. 10.

Figure 11:
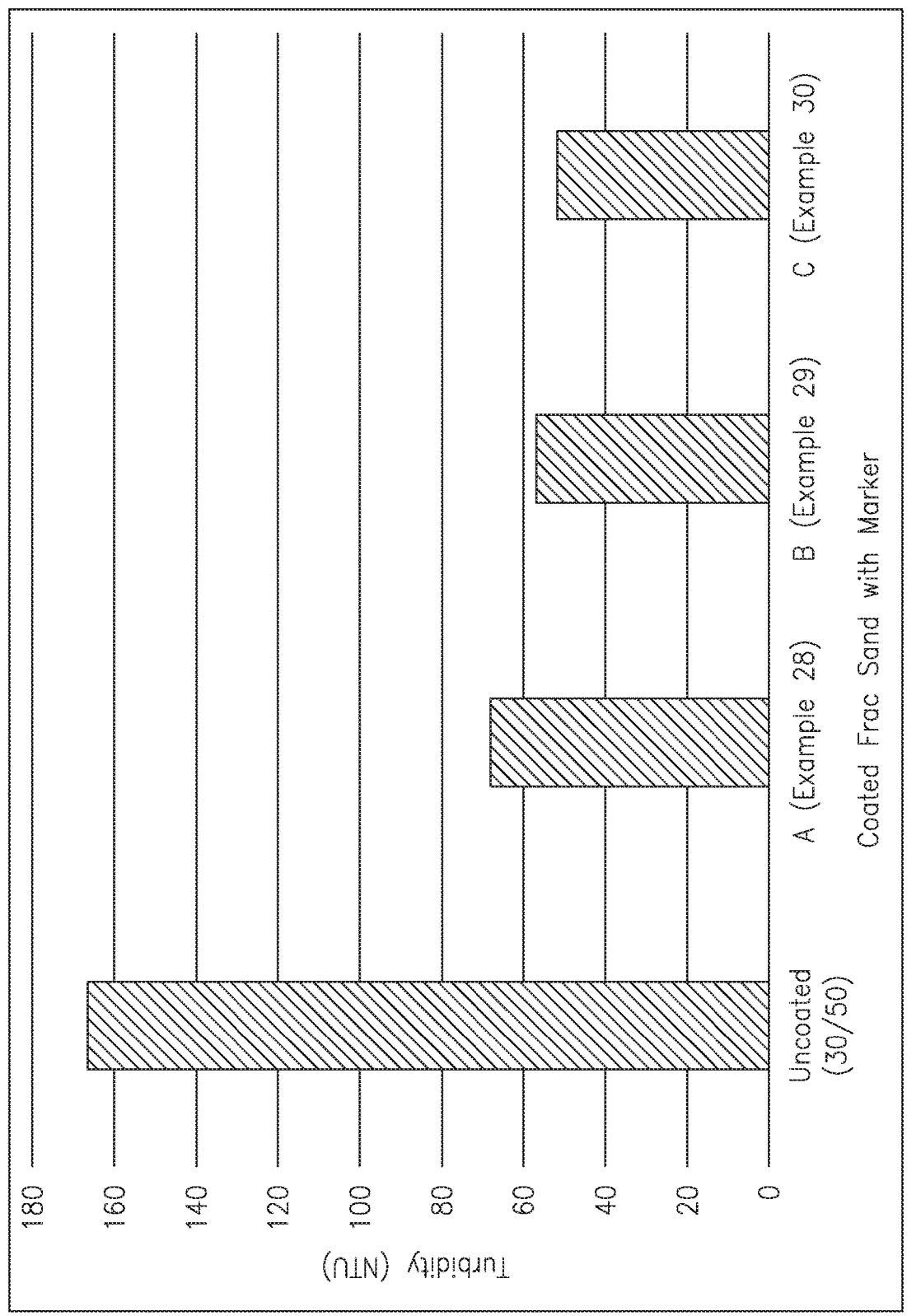
FIG. 11 is a chart showing the dust/fines reduction, as measured by turbidity, of the surface modified proppants described in Examples 28 through 30.

Example 28. Conventional northern white sand (30/50) was treated with glycerin/water/KCl (66.4/32.7/0.9; pre-mixed) at 0.125 wt. % of the frac sand at ambient temperature. Product was then mechanically mixed and placed in a ball mill for six-hour grinding at ambient temperature. The turbidity of the ground sample, 68 NTU, is shown as A in FIG. 11. KCl was added to the coating as a marker by increasing the electrical conductivity of the wash-off liquid of the coated frac sand. Uncoated conventional northern white sand (30/50) was placed in a ball mill for six-hour grinding at ambient temperature. The turbidity of the ground sample was 167 NTU.

Example 29. As described in Example 28, the 30/50 sand was treated with glycerin/water/Rhodamine WT (67.00/32.99/0.01; pre-mixed) at 0.125 wt. % of the frac sand at ambient temperature. Product was then mechanically mixed and placed in a ball mill for six-hour grinding at ambient temperature. The turbidity of the ground sample, 57 NTU, is shown as B in FIG. 11. Rhodamine was added to the coating as a UV marker for composite proppant.

Example 30. As described in Example 28, the 30/50 sand was treated with glycerin/water/Ecosphere 300 (Clariant) (66.77/32.32/2.91; pre-mixed) at 0.125 wt. % of the frac sand at ambient temperature. Product was then mechanically mixed and placed in a ball mill for six hour grinding at ambient temperature. The turbidity of the ground sample, 52 NTU, is shown as C in FIG. 11. Ecosphere 300 was added to the coating as a color marker for composite proppant.

Example 31. As described in Example 1, laboratory distilled water was used to treat the frac sand at a level of 1.0 wt. % of the frac sand at ambient temperature. The turbidity after the 12.5 hour grinding at ambient temperature was over 800 NTU, over the scale. Water apparently can help to suppress dust but would not help to improve the attrition resistance of frac sand. Frac sand was also treated with tall oil pitch/yellow grease in a 50/50 blend at 0.10 wt. % at ambient temperature and the turbidity after the 12.5 hour grinding was 13 NTU.

Example 32. A commercial northern white sand (20/40) coated with phenolic/formaldehyde cross-linked polymer was subjected to a 12.5 hour grinding and the turbidity after the grinding was 480 NTU.

Example 33. A commercial northern white sand (40/70) coated with propylene glycol/water (67/33) at 0.125 wt. % level of the frac sand was used for a pneumatic air unloading in a scaled down study as described in Example 15. Coated frac sand prepared based on Example 1 [northern white sand (20/40) coated with tall oil pitch at 0.10 wt. %] and coated frac sand based on Example 7 [northern white sand (20/40) coated with glycerin/water (67/33) at 0.15 wt. %] were also subjected to this same type pneumatic air unloading test.

Example 34. A common northern white sand (70/140) was coated first with a tall oil pitch comprising coating [tall oil pitch/soybean oil (80/20)] at 0.125 wt. % followed by a glycerin-comprising second coating [glycerin/water (67/33)] at 0.005 wt. %. The coated frac sand was then subjected to a pneumatic air unloading test as described in Example 33.

The percent total respirable dust reduction compared to the uncoated frac sand (70/140) was about 94%. The turbidity of the coated frac sand was about 2 NTU or about 98% reduction compared to the uncoated one.

Figure 12:
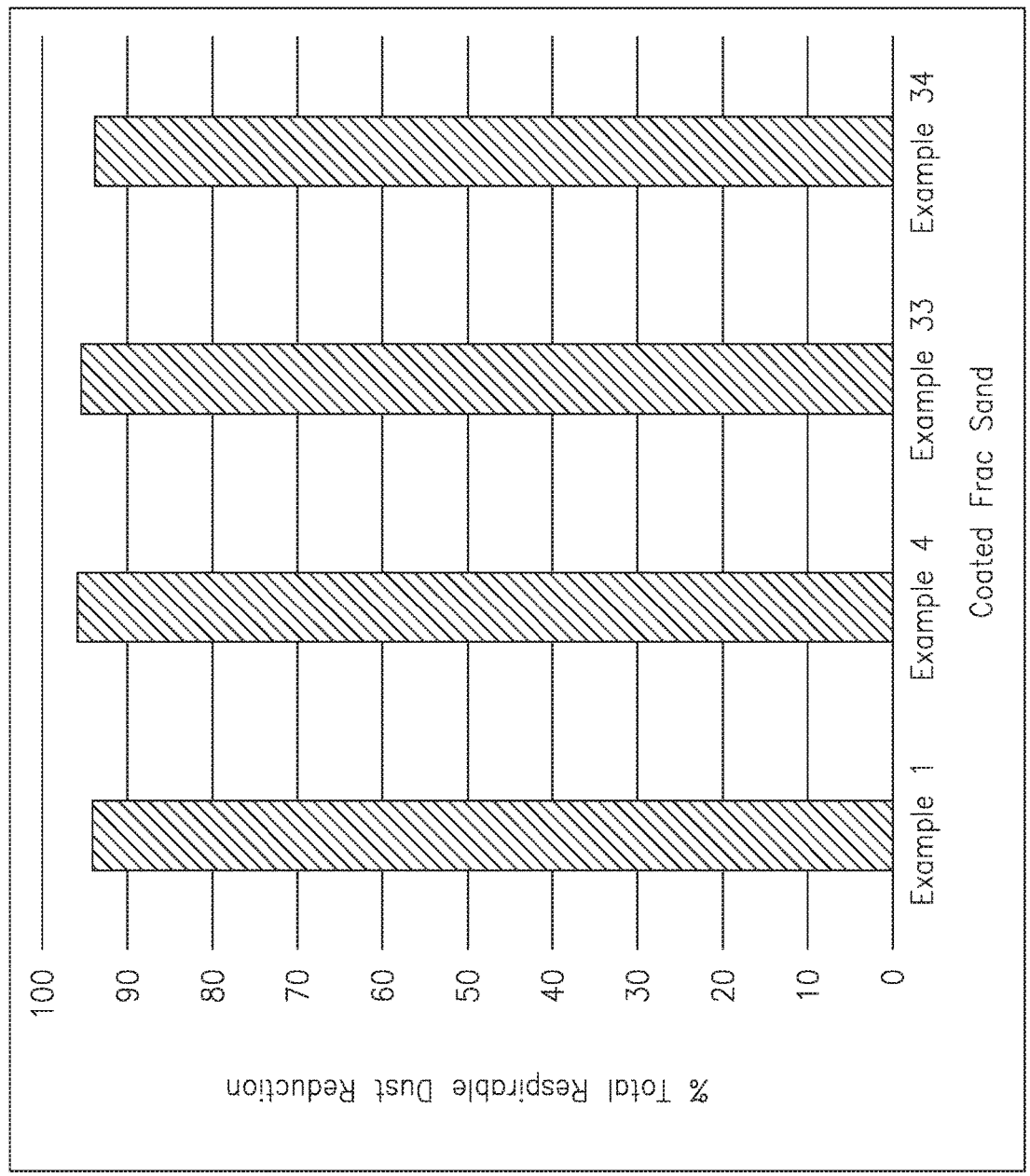
FIG. 12 is a chart showing the total respirable dust reduction, as measured in percentage, of the surface modified proppants described in Examples 1 and 4 as tested in Example 15, Example 33, and Example 34.

The percent total respirable dust (10 micron in size) reduction compared to the uncoated frac sand for each coating is shown in FIG. 12. Over 90% reduction in total respirable dust generation was noticed on each coated frac sand. This is a direct measurement showing the improvement provided by this invention over conventional, uncoated frac sand. The reduction in total respirable dust translates to health benefits for the workers who are responsible for handling the material and other persons near the site, as well as environmental benefits for the plants, wildlife, and water systems near the site.

There may be additional benefits to use of the material downhole. According to the literatures (SPE-171604-MS and Proppant Brief from FairmountSantrol), dust/fines in the frac sand pack downhole contributed to the conductivity loss for the oil well. Among other things, they found that as little as 5% fines can reduce hydrocarbon flow rate up to 60%. Halliburton has published similar findings, concluding that the control of fines has proven to be the most valuable contributor to extending conductivity maintenance. The invasion of fines into a proppant pack can affect pack permeability, resulting in underperformance and premature decline in well productivity.

Figure 13:
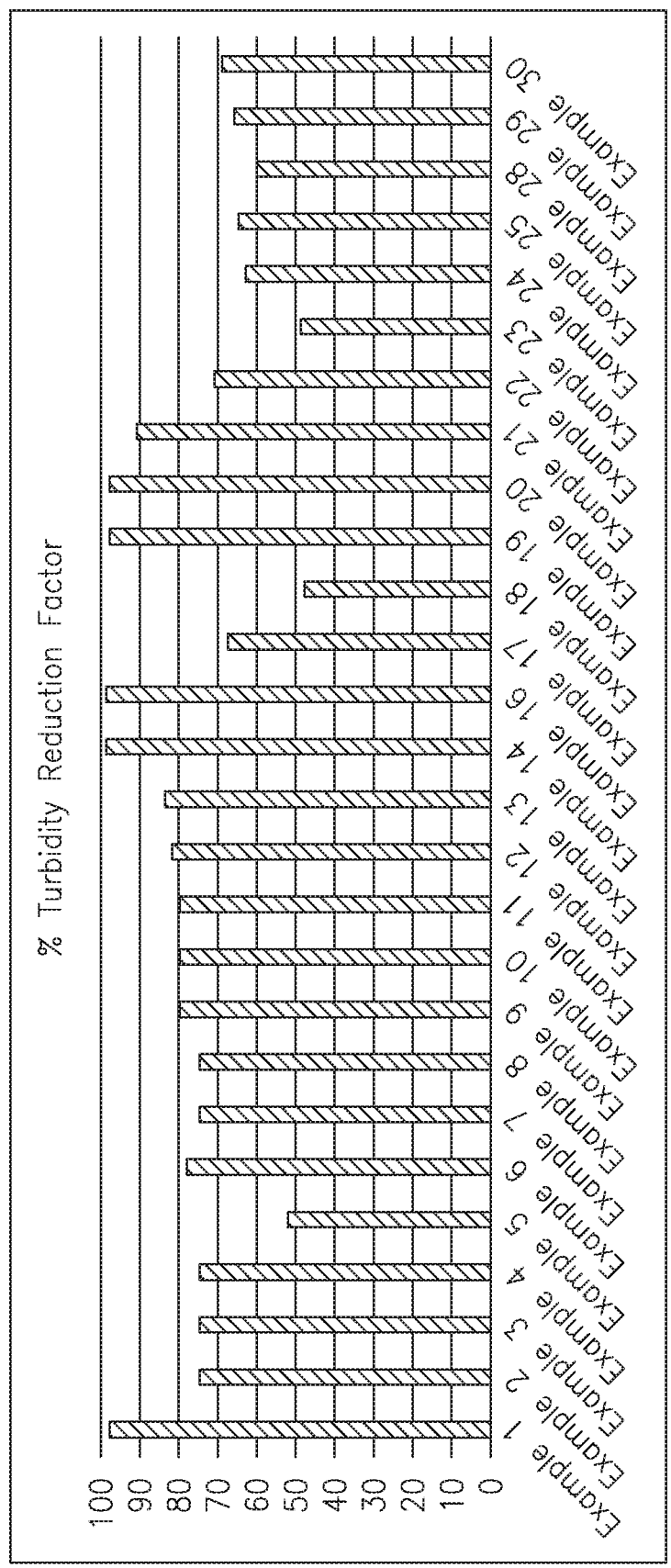
FIG. 13 is a chart showing the total percent turbidity reduction factor across many of the samples described in Examples 1 through 14, 16 through 25, and 28 through 30.

FIG. 13 is a chart showing the total percent turbidity reduction factor across many of the samples described in the examples. The Turbidity Reduction Factor (TRF) can be expressed as a percentage according to the difference between the turbidity of a ground uncoated sample and the turbidity of a ground coated sample, divided by the turbidity of the ground uncoated sample, multiplied by 100 to yield percent, where all turbidity measurements are in common units such as NTU. TRF provides an indication of improvement in the surface modified proppant versus a standard, uncoated proppant, including the material's resilience to the creation of dust/fines. It has been found that dust/fines are suppressed and other benefits are achievable where the TRF is at least 40%, preferably more than 60%, and most preferably more than 70%.

The Respirable Dust Reduction Factor (RDRF) is another indication of improvement in the surface modified proppant compared to standard, uncoated proppant. RDRF can be expressed as a percentage according to the difference between the respirable dust of an uncoated sample and the respirable dust of a coated sample, divided by the respirable dust of the uncoated sample, multiplied by 100 to yield percent, where all respirable dust measurements are in common units. It has been found that dust/fines are suppressed and other benefits are achievable where the RDRF is greater than about 70%.

Whereas, the devices and methods have been described in relation to the drawings and claims, it should be understood that other and further modifications, apart from those shown or suggested herein, may be made within the spirit and scope of this invention.

What is claimed is:

1. A method of producing a surface modified proppant, the method comprising:
    adding a chemical coating to a proppant, where the chemical coating is not a thermoset polymer, not an ionic polymer, not a thermoplastic elastomer, and not a hydrogel; and
    mixing the coating and the proppant or spraying the coating on the proppant to produce the surface modified proppant, where the coating is 0.05 to 0.20 wt. % of the surface modified proppant.

2. The method of claim 1 where the coating is non-petroleum-based, glycerin-based, propylene glycol-based, or a combination thereof.

3. The method of claim 1 where the mixing occurs in a powered continuous mechanical blender, a powered batch mechanical blender, a static mixer, or a combination thereof.

4. The method of claim 1 further comprising:
    adding a second chemical coating to the surface modified proppant; and
    mixing the second chemical coating and the surface modified proppant.

\* \* \* \* \*